(12) United States Patent
Reboldi et al.

(10) Patent No.: US 11,102,939 B2
(45) Date of Patent: Aug. 31, 2021

(54) SYSTEM FOR COVERING FLAT SURFACES

(71) Applicant: REM TEC S.R.L., Casalromano (IT)

(72) Inventors: Alessandro Reboldi, Rezzato (IT); Roberto Angoli, Chiari (IT)

(73) Assignee: REM TEC S.R.L., Casalromano (IT)

( * ) Notice: Subject to any disclaimer, the term of this patent is extended or adjusted under 35 U.S.C. 154(b) by 241 days.

(21) Appl. No.: 16/094,239

(22) PCT Filed: May 23, 2016

(86) PCT No.: PCT/IT2016/000134
§ 371 (c)(1),
(2) Date: Oct. 17, 2018

(87) PCT Pub. No.: WO2017/203545
PCT Pub. Date: Nov. 30, 2017

(65) Prior Publication Data
US 2019/0119944 A1    Apr. 25, 2019

(51) Int. Cl.
*A01G 13/02* (2006.01)
*F03D 13/20* (2016.01)
(Continued)

(52) U.S. Cl.
CPC ........... *A01G 13/0206* (2013.01); *A01G 9/22* (2013.01); *A01G 9/243* (2013.01); *E04F 10/02* (2013.01);
(Continued)

(58) Field of Classification Search
CPC ...... A01G 13/0206; A01G 9/22; A01G 9/227; A01G 9/243; E04F 10/02; E04F 10/04;
(Continued)

(56) References Cited

U.S. PATENT DOCUMENTS 711,225 A    10/1902   Putnam et al.
3,140,563 A * 7/1964  Allen .................. A01G 13/0206
                                             47/22.1
(Continued)

FOREIGN PATENT DOCUMENTS

CA      3007905 A1 *  6/2017  ............ F24S 30/455
CA      2920207 A1 *  8/2017  ............. E04F 10/04
(Continued)

OTHER PUBLICATIONS 12 page PDF of machine translation of FR 2883320 to Schmitt. (Year: 2006).*
(Continued)

*Primary Examiner* — Robert Canfield
(74) *Attorney, Agent, or Firm* — Morgan, Lewis & Bockius LLP

(57) ABSTRACT

System for covering flat surfaces that is installed on support structures formed by support poles (2) maintained in position by a network of tie-rods (3), both the support poles and the tie-rods being fixed on the surface by means of suitable pins. Said system comprises a plurality of pairs of elongated support elements (6, 6') having a lower portion positioned on such poles (2) and being joined together in raised position in proximity to their upper end, to form a plurality of pairs of slopes on which protection nets or protection sheets (7) are positioned, which in open position cover the area below the support structure and which in closed position are compact and amassed between adjacent poles (2) of the same row; the movement from the open position to the closed one and vice versa being obtained through the sliding of the sheet along the support elements by means of movement means.

15 Claims, 4 Drawing Sheets

(51) Int. Cl.
*H02S 20/10* (2014.01)
*A01G 9/22* (2006.01)
*A01G 9/24* (2006.01)
*E04F 10/04* (2006.01)
*E04F 10/02* (2006.01)
*E04H 15/42* (2006.01)

(52) U.S. Cl.
CPC ........... *E04F 10/04* (2013.01); *E04H 15/425* (2013.01); *F03D 13/20* (2016.05); *H02S 20/10* (2014.12)

(58) Field of Classification Search
CPC . E04B 7/14; E04B 7/166; E04H 15/54; E04H 15/58; E04H 15/425
USPC ............ 47/22.1, 29.5, 29.6, 31, 17; 135/913
See application file for complete search history.

(56) References Cited

U.S. PATENT DOCUMENTS

| | | | | | |
|---|---|---|---|---|---|
| 3,481,073 | A | * | 12/1969 | Eiichi | A01G 9/22 47/17 |
| 4,827,957 | A | * | 5/1989 | Chang | A01G 9/1407 135/121 |
| 5,513,470 | A | * | 5/1996 | Vollebregt | E04B 7/166 52/13 |
| 2004/0049991 | A1 | * | 3/2004 | Arbel | A01G 9/1407 52/63 |
| 2005/0109384 | A1 | * | 5/2005 | Shingleton | F24S 10/00 136/244 |
| 2007/0214714 | A1 | * | 9/2007 | Harnois | A01G 9/1407 47/17 |
| 2009/0107038 | A1 | * | 4/2009 | Wan | A01G 2/00 47/22.1 |
| 2011/0113705 | A1 | * | 5/2011 | Raczkowski | H02S 10/12 52/173.3 |
| 2011/0221203 | A1 | * | 9/2011 | Miller | F03D 9/11 290/55 |
| 2011/0315197 | A1 | * | 12/2011 | Angoli | F24S 25/50 136/246 |
| 2012/0216468 | A1 | * | 8/2012 | Liu | E04D 11/002 52/173.3 |
| 2013/0118099 | A1 | * | 5/2013 | Scanlon | H02S 20/22 52/173.3 |
| 2013/0306136 | A1 | * | 11/2013 | Hendrickson, Jr. | F24S 30/422 136/246 |
| 2014/0327244 | A1 | * | 11/2014 | Angoli | F03D 9/25 290/55 |
| 2020/0022341 | A1 | * | 1/2020 | Li | A01K 61/60 |
| 2020/0127597 | A1 | * | 4/2020 | Reboldi | F24S 30/45 |

FOREIGN PATENT DOCUMENTS

| | | | | |
|---|---|---|---|---|
| CH | 706132 | A2 | 8/2013 | |
| CN | 1305697 | A | 8/2001 | |
| CN | 102113457 | A | 7/2011 | |
| CN | 202857436 | U | 4/2013 | |
| DE | 2520557 | A1 * | 11/1976 | ............... A01G 9/22 |
| DE | 102005062093 | A1 * | 7/2006 | ......... A01G 13/0206 |
| DE | 102009047383 | A1 * | 6/2011 | ......... A01G 13/0206 |
| DE | 102010001948 | A1 * | 8/2011 | ......... A01G 13/0206 |
| DE | 102013002825 | A1 | 8/2014 | |
| DE | 202016103168 | U1 * | 7/2016 | ......... A01G 13/0206 |
| DE | 102018121845 | A1 * | 3/2020 | ......... A01G 13/0206 |
| EP | 481870 | A1 * | 4/1992 | |
| FR | 1464097 | A * | 7/1966 | ............. E04B 7/166 |
| FR | 2103257 | A5 | 4/1972 | |
| FR | 2214398 | A1 * | 8/1974 | ......... A01G 13/0206 |
| FR | 2246702 | A1 * | 5/1975 | ............. E04B 7/166 |
| FR | 2668028 | A1 | 4/1992 | |
| FR | 2883320 | A1 * | 9/2006 | ......... A01G 13/0206 |
| FR | 2963720 | A1 | 2/2012 | |
| JP | 2015092850 | A * | 5/2015 | |
| NL | 8901473 | A * | 1/1991 | ............... A01G 9/22 |
| NL | 9200389 | A * | 10/1993 | ............... A01G 9/22 |
| WO | WO-9606244 | A1 * | 2/1996 | ............. E04B 7/107 |
| WO | 2010/103378 | A1 | 9/2010 | |
| WO | 2013/076573 | A1 | 5/2013 | |

OTHER PUBLICATIONS

International Search Report and Written Opinion dated Feb. 20, 2017, issued in corresponding International Patent Application No. PCT/IT2016/000134.

International Preliminary Report on Patentability dated Jul. 17, 2018, issued in corresponding International Patent Application No. PCT/IT2016/000134.

First Office Action dated Jun. 22, 2020 issued in Chinese Application No. 201680084777.8.

* cited by examiner

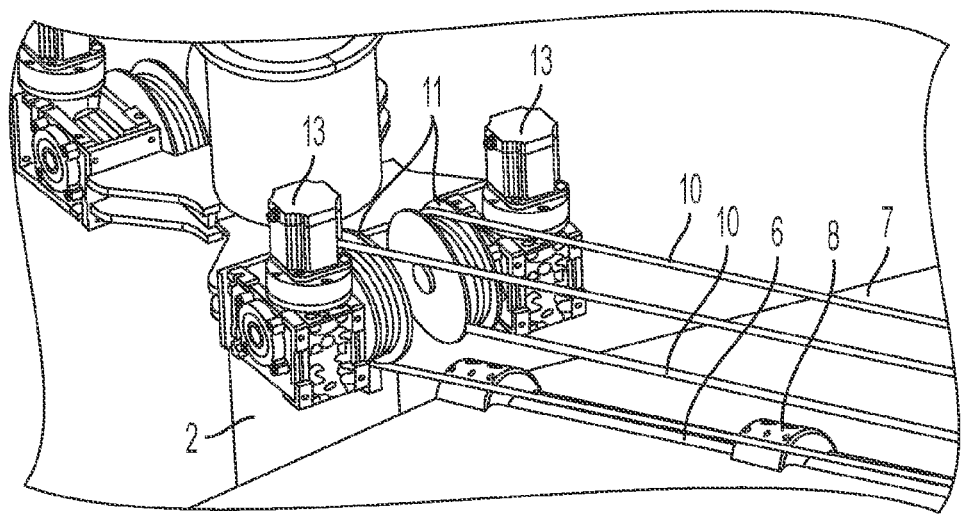
FIG. 6
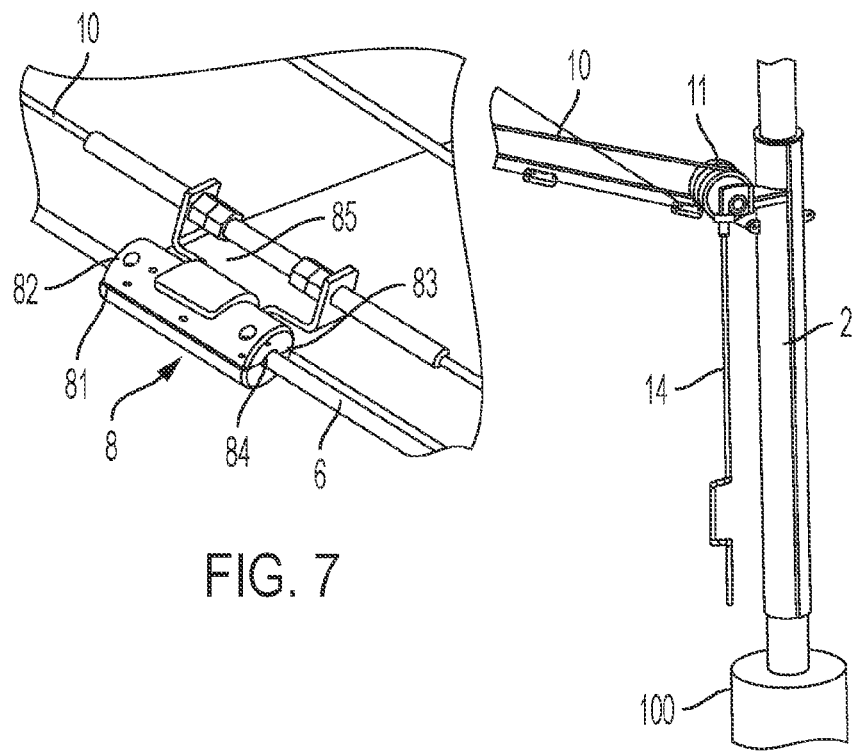
FIG. 7
FIG. 8

SYSTEM FOR COVERING FLAT SURFACES

The present invention refers to a support structure on which a system is installed that is adapted to allow an adjustable covering on flat surfaces.

Such covering can be a covering adapted to create a shading for protecting from the solar rays or a covering adapted to create different temperature conditions, such as greenhouses, or a covering adapted to protect against weather events such as hail. The surfaces to be protected or covered are in fact, according to a preferred embodiment, farm fields. In particular, such structure is obtained by means of a group of poles distributed along the farm field itself. Structures are known that are composed of poles positionable on farm fields, such poles supporting electrical energy generation units, e.g. photovoltaic panels or wind units placed on the top of such structures.

In the patent WO2010103378, a load-bearing structure is described formed by support poles maintained in position by a network of tie-rods, both the support poles and the tie-rods being fixed in the ground by means of pins. The positionable solar panels are of so-called "solar followers" type, capable of rotating around two axes. Such followers comprise a main horizontal load-bearing tube, which can rotate around its axis, to which a plurality of secondary tubes are connected, perpendicularly fixed to the main tube and which can be rotated around the axis thereof. The solar panels are fixed on such secondary tubes. The ends of the main tube of the follower are abutted against and fixed on such support poles.

In the patent WO2013076573, a support pole structure is described, of the type that also supports wind modules. Such structure is two-dimensional in a "chessboard" manner and can be installed on farmlands as well, since it is raised and the distance between the support poles is such to allow the passage of farm vehicles, even large ones.

The Applicant has perceived that the solar illumination of the space between the support poles can be advantageously modulated by means of movable canvases or curtains, anchored to such poles and/or tie-rods by means of mechanisms and guides which also allow the movement thereof.

The object of the present invention is to provide a structure for shading farm fields or similar substantially flat surfaces having the features of the appended claim 1.

The features and advantages of the present invention will be more evident from the following description of an exemplary and non-limiting embodiment of the invention, referred to the appended schematic drawings, in which:

FIG. 6 illustrates in particular the means for fixing and those for moving the sheets of the system to a pole of the support structure;

FIG. 7 illustrates a means for the slidable constraining of the sheets like that illustrated in FIG. 5;

FIG. 8 illustrates a manual means for moving the sheets, associated with a pole.

Figure 1:
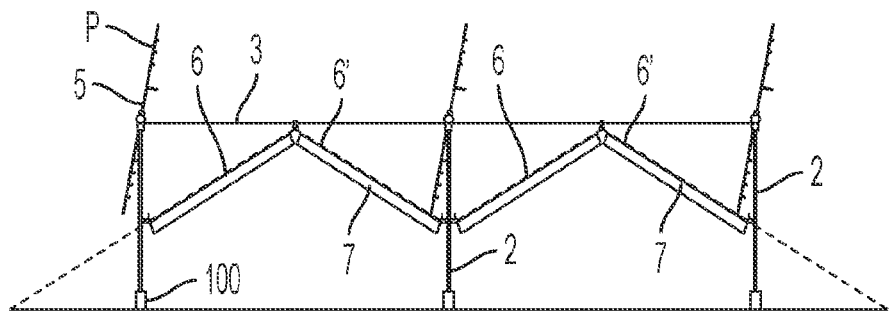
FIG. 1 illustrates, in side view, the support structure with the shading system according to the present invention installed.
Figure 2:
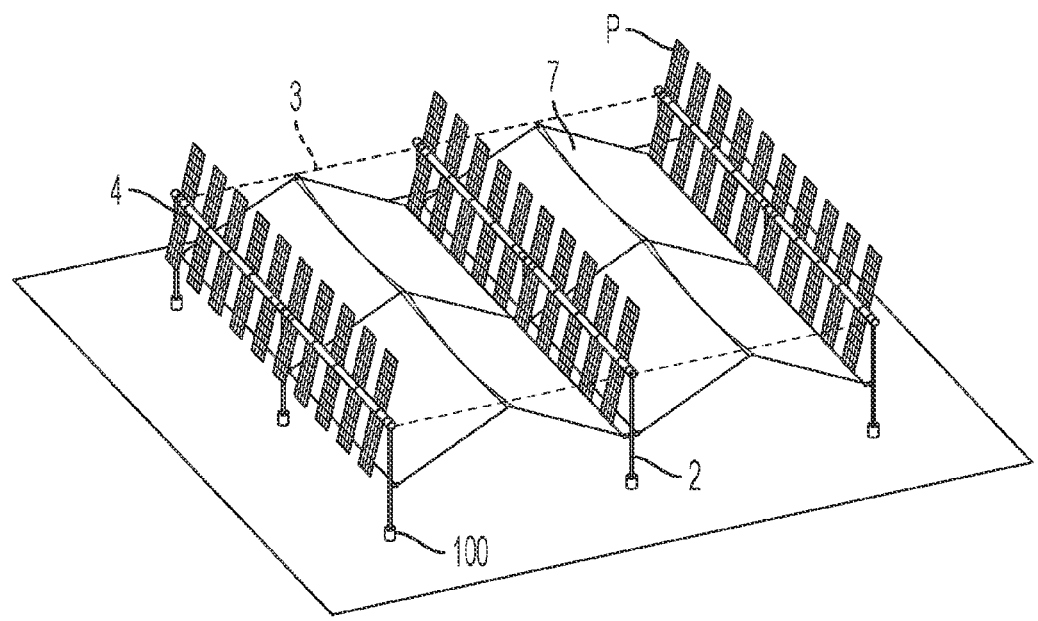
FIG. 2 illustrates, in perspective view, the support structure with the shading system according to the present invention installed.
Figure 3:
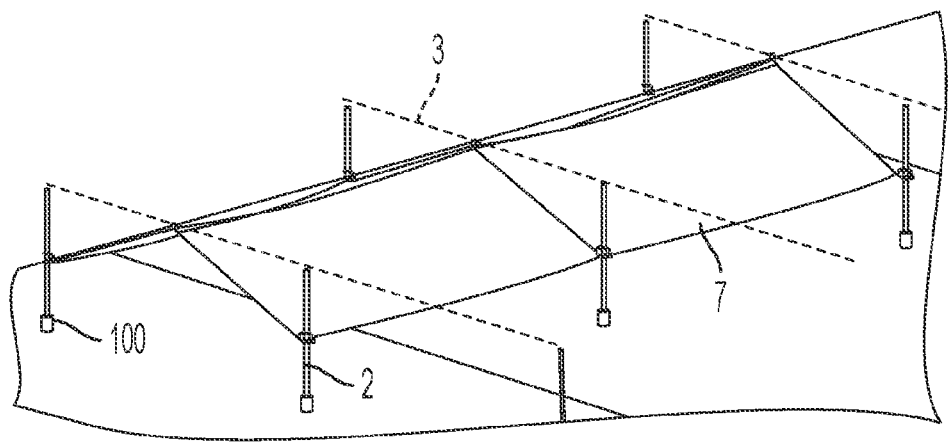
FIG. 3 illustrates a portion of the structure of FIGS. 1 and 2.
Figure 4A:
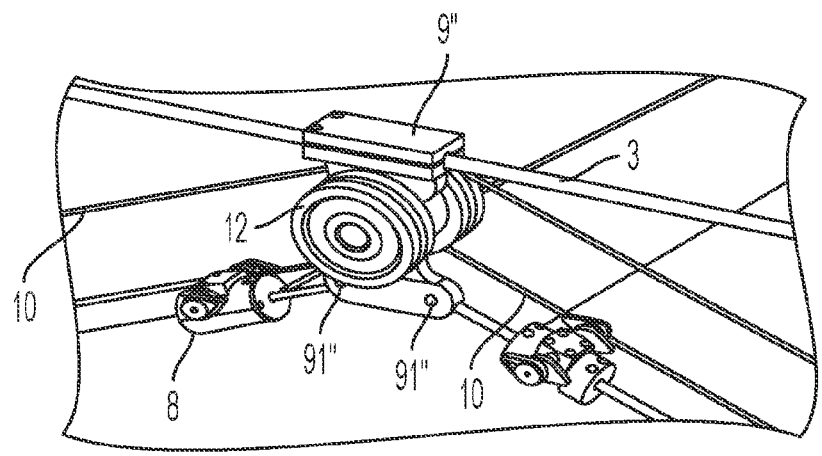
FIG. 4a illustrates in particular the means for fixing the system to the tie-rods on the top of the support structure.
Figure 4B:
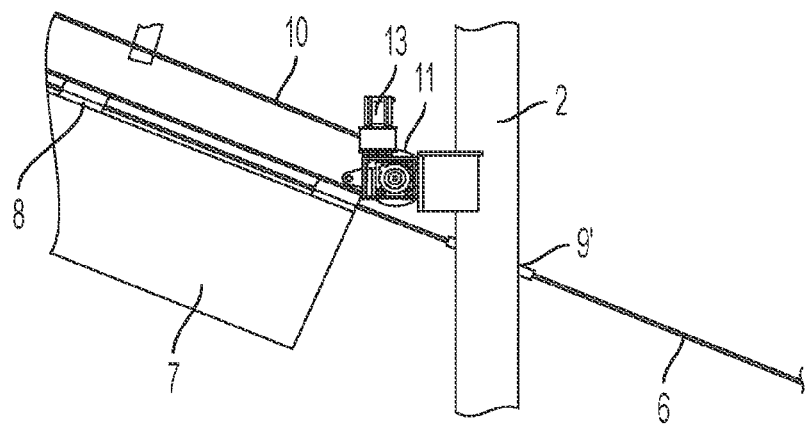
FIG. 4b illustrates in particular the means for fixing the system to a final pole of the support structure and the means for moving the sheet associated with such pole.
Figure 4C:
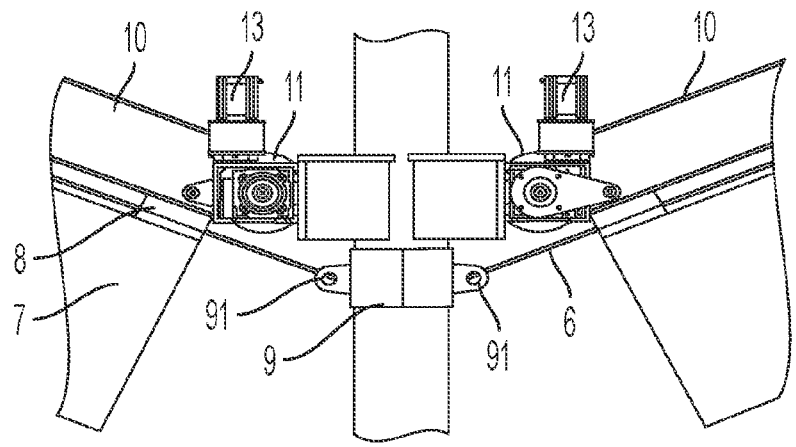
FIG. 4c illustrates in particular the means for fixing the system to an intermediate pole of the support structure and the means for moving the opposite sheets associated with such pole.
Figure 5:
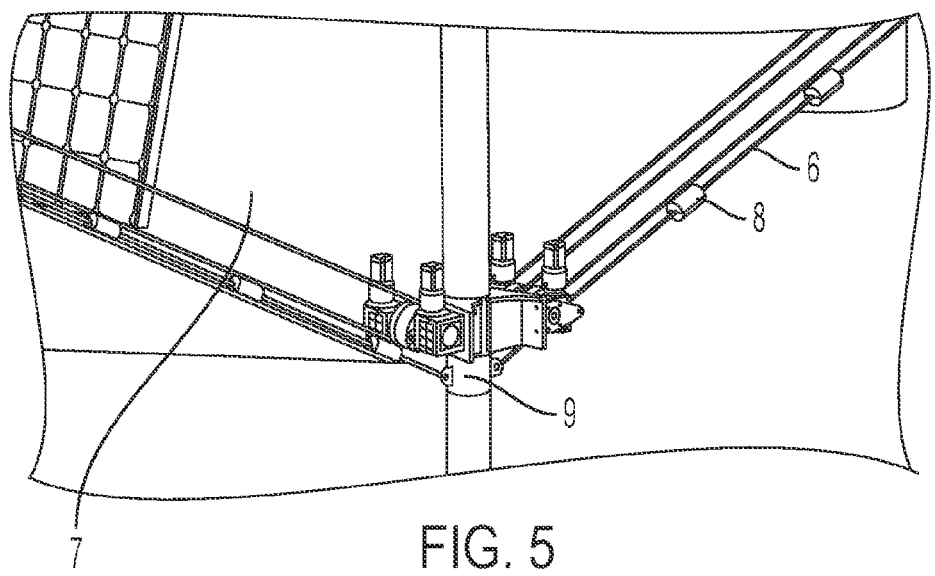
FIG. 5 illustrates the slidable constraining means for the sheets with respect to the elongated support element.

With reference to the abovementioned figures, the covering system according to the present invention is installed on support structures formed by support poles 2 maintained in position by a network of tie-rods 3, both the support poles and the tie-rods are fixed in the ground by means of suitable pins 100. Such structure is configured two-dimensional, e.g. following a "chessboard" scheme and can also be installed on farmlands, since it is raised and the distance between the support poles is such to allow the passage of farm vehicles, even large ones.

On such structures, electrical energy generation units can be installed or positioned, for example photovoltaic panels or wind units, placed on the top of such structures. Such units can be directly placed on the top of the support poles, or they can be positioned horizontally between one pole and the other.

In the illustrated example, solar followers are placed on the structure, that comprise a main horizontal load-bearing tube 4, which can rotate around its axis, to which a plurality of secondary tubes 5 are connected, which are perpendicularly fixed to the main tube and which can be rotated around the axis thereof. The solar panels P can be fixed on such secondary tubes.

The covering system comprises a plurality of pairs of elongated support elements 6 and 6' having a lower portion positioned on such poles 2 and being joined together in raised position in proximity to their upper end, to form a plurality of pairs of slopes on which protection nets or protection sheets 7 can be positioned, which in open position cover the area below the support structure and which in closed position are compact and amassed between adjacent poles 2 of the same row; the movement from the open position to the closed position and vice versa occurs through sliding of the sheet along the support elements.

In general, the nets that can be coupled to the system of the present invention can be of different type, in accordance with the requirements of the farm cultivation below the plant.

Generally, the system is designed for shade nets used in agriculture. In substance, these are nets made of polyethylene stabilized against UV rays, with a different shading degree (50%, 70%, 90% depending on the requirements). In place of the shade nets, however, also anti-hail nets can be installed, or transparent sheets if one wishes to make a greenhouse (in this case, lateral vertical closures would also have to be provided).

The joining point and of maximum height or top 61 of each pair of elements, is advantageously positioned on such tie-rods 3. In addition, such elongated elements are advantageously constrained to the poles at a substantially intermediate height with respect to the height of the pole itself.

Such elongated elements in the illustrated embodiment are metal cables or metal bars, but in an equivalent manner they could be substituted by section bars.

The sheets are associated with the elongated element 6 or 6' by means of a plurality of constraining means 8 slidable along such elongated element. In the illustrated embodiment, such constraining means comprise a sleeve made of two annular sectors 81 and 82 provided with notches on the edge, that when such sectors are joined together, for example by means of screws, they form a groove 83 which is crimped on the edge of the sheet. A through hole 84 of the sleeve allows the sliding on the elongated element.

Clearly, such solution could be achieved with equivalent means, e.g. with an elongated section bar in place of the cable 6 or 6' provided with dovetail guides in which the slidable constraining means to the sheet are engaged.

Such slidable constraining means also comprise a bracket 85 associated with the sleeve, which is moved together with the sleeve along the elongated element by the means for moving the sheets associated with such poles.

The elongated elements are fixed to the poles and to the tie-rods by means of fixing means which comprise a ring 9 crimped on the pole provided with eyelets 91, to which the end of the elongated element 6 or 6' is fixed when this is an intermediate pole of the structure. If the pole is the final pole of the structure, such fixing means comprise a bush 9' which crosses the pole as well as the support element which is then fixed to the ground. Such fixing means also comprise a support 9" crimped on the tie-rod 3 which in its lower portion has fixing eyelets 91" for the elongated element 6 or 6'.

The means for moving the sheets which allow the opening and closing thereof substantially comprise, for at least one side of the sheet, an annular belt 10 arranged substantially in a position adjacent to the elongated elements 6 or 6', which substantially follows the length thereof, moved by means of a drive pulley 11 associated with the poles and driven by a driven pulley positioned at the top 61 of the structure, advantageously at the support 9". The belt is then arranged along the entire path of the slidable constraining means 8, which are constrained to the sheet and also to such belt by means of the abovementioned bracket 85.

Each drive pulley can be rotated by means of an electric motor 13, preferably provided with reduction mechanism, or it can be manually moved by means of a rod 14. The driven pulley 13 is advantageously associated with the top support 9" of the structure.

The invention claimed is:

1. A system for covering flat surfaces on a support structure formed by support poles maintained in position by a network of tie-rods, both the support poles and the tie-rods being fixed on a flat surface by means of pins, the system comprising:
   the support structure comprising:
      the support poles;
      the tie-rods; and
      a plurality of pairs of elongated support elements having a lower portion positioned on the support poles and being joined together in raised position in proximity to their upper end, to form a plurality of pairs of slopes on which protection nets or protection sheets are positioned, which in an open position cover the area below the support structure, and which in a closed position are compact and amassed between adjacent support poles of a same row of support poles, movement from the open position to the closed one and vice versa being obtained through the sliding of the protection nets or protection sheets along the elongated support elements by means of a movement means,
   wherein, on top of the support structure above the protection nets or protection sheets, electrical energy generation units are installed, and
   wherein the joining point and maximum height or top of each pair of elongated support elements, is positioned on the tie-rods.

2. The system of claim 1, wherein the elongated support elements are constrained to the support poles at a substantially intermediate height with respect to the height of each respective support pole itself.

3. The system of claim 1, wherein the elongated support elements are metal cables or metal bars, or section bars.

4. The system of claim 1, wherein the protection nets or protection sheets are associated with the elongated support elements by means of a plurality of constraining means, the plurality of constraining means being slidable along the elongated support elements.

5. The system of claim 1, wherein the movement means for moving the protection nets or protection sheets comprise an annular belt arranged substantially in a position adjacent to the elongated support elements, which substantially follows the length thereof, moved by means of at least one drive pulley associated with each of the support poles and driven by a driven pulley positioned at the top of the support structure, the belt then being arranged along the entire path of a slidable constraining means, which are also constrained to the belt by means of a bracket.

6. The system of claim 5, wherein each of the at least one drive pulley associated with each of the support poles is rotated by means of an electric motor, or it can be manually moved by means of a rod.

7. The system of claim 5, wherein the driven pulley is associated with a top support of the support structure.

8. The system of claim 1, wherein the elongated support elements are fixed to the support poles and to the tie-rods by means of fixing means comprising:
   a ring crimped on a pole provided with eyelets, to which the end of the corresponding elongated support element is fixed when the pole provided with eyelets is an intermediate pole of the support structure;
   a bush that crosses the pole provided with eyelets as well as the elongated support element, which is fixed to the ground, if the pole provided with eyelets is the final pole of the support structure; and
   a crimped support crimped on the tie-rod, which, in its lower portion, has fixing eyelets for the corresponding elongated support element.

9. The system of claim 8, wherein a driven pulley is associated with a top support of the support structure.

10. The system of claim 1, wherein the protection nets or protection sheets are shade nets or sheets used in agriculture.

11. The system of claim 10, wherein the protection nets are made of polyethylene stabilized against UV rays, with a shading degree of 50-90%.

12. The system of claim 1, wherein the protection sheets are anti-hail sheets.

13. The system of claim 1, wherein the protection sheets are transparent sheets.

14. The system of claim 1, in which the electrical energy generation units are photovoltaic panels or wind units directly placed on the top of the support poles.

15. A system for covering flat surfaces on a support structure formed by support poles maintained in position by a network of tie-rods, both the support poles and the tie-rods being fixed on a flat surface by means of pins, the system comprising:
   the support structure comprising:
      the support poles;
      the tie-rods; and
      a plurality of pairs of elongated support elements having a lower portion positioned on the support poles and being joined together in raised position in proximity to their upper end, to form a plurality of pairs of slopes on which protection nets or protection sheets are positioned, which in an open position cover the area below the support structure, and which in a closed position are compact and amassed between adjacent support poles of a same row of support poles, movement from the open position to the closed one and vice versa being obtained through the sliding of the protection nets or protection sheets along the elongated support elements by means of a movement means, wherein, on top of the support structure above the protection nets or protection sheets, electrical energy generation units are installed, wherein the protection nets or protection sheets are associated with the elongated support elements by means of a plurality of constraining means, the plurality of constraining means being slidable along the elongated support elements, and wherein the constraining means comprise a sleeve made of two annular sectors provided with notches on an edge, such that, when the annular sectors are joined together form a groove that is crimped on the edge of the sheet, a through hole of the sleeve allows the sliding on the elongated support element.

* * * * *